D. B. CLEMENT.
Horse Hay Fork.
No. 41,484.
Patented Feb. 9, 1864.
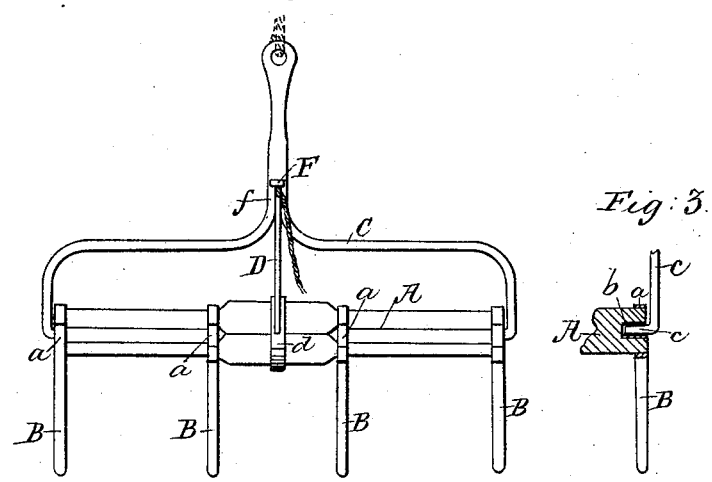
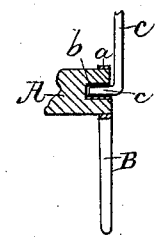
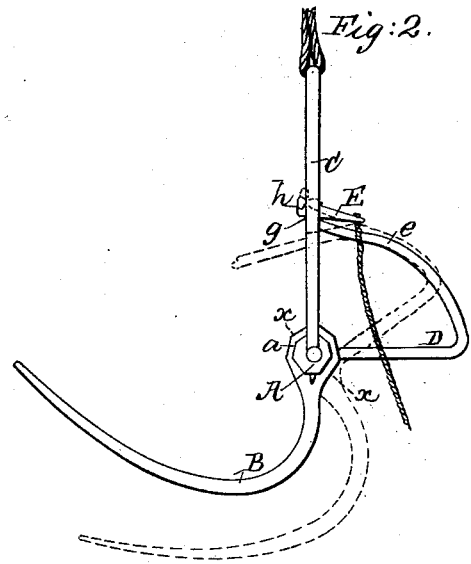
Witnesses.
M. M. Livingston
Thos. B. Douglas
Inventor.
D. B. Clement

UNITED STATES PATENT OFFICE.

D. B. CLEMENT, OF BROOKLYN, NEW YORK.

IMPROVEMENT IN HORSE HAY-FORKS.

Specification forming part of Letters Patent No. 41,484, dated February 9, 1864.

*To all whom it may concern:*

Be it known that I, D. B. CLEMENT, of Brooklyn, in the county of Kings and State of New York, have invented a new and useful Horse Hay-Fork; and I do hereby declare that the following is a full, clear, and exact description of the same, reference being had to the accompanying drawings, making a part of this specification, in which—

Figure 1 is a back view of my invention; Fig. 2, a side view of the same; Fig. 3, a section of one end of the same, taken in the line $x\ x$, Fig. 2.

Similar letters of reference indicate corresponding parts in the several figures.

To enable those skilled in the art to fully understand and construct my invention, I will proceed to describe it.

A represents the head of the fork, which is constructed of wood and of polygonal form.

B represents the tines of the fork, which may be of the usual curved form. These tines have eyes $a$, formed at their inner ends, the eyes corresponding in shape to the head A, so that the former may be fitted on the latter, and, if necessary, secured thereon by wedges. By this arrangement it will be seen that the tines are prevented from turning on the head, and the eyes $a$, at the same time, are made to serve the purpose of bands to strengthen the head and admit of a much lighter one being used than is possible to use with those forks in which the tines are provided with shanks inserted in the head, for in the latter case the shanks of the tines, when the fork is loaded, are liable to split the head; and in order to prevent that the head requires to have quite heavy metal bands upon it.

In the ends of the head A there are made longitudinal holes, in which metal tubes or bushes $b$ receive the ends $c$ of a bail, C, to the upper end of which the hoisting-rope is attached. The head A is allowed to turn freely in the bail in consequence of the ends $c$ of the same being fitted loosely in the tubes or bushes $b$.

On the center of the head A there is fitted the eye $d$ of a bent rod or bar, D. The central part of the head A of the fork may be of square form, and the eye $d$ of a similar form, so as to prevent the eye from turning on the head. A polygonal form corresponding to the other part of the head and a polygonal eye, $d$, would probably answer equally as well. The upper part, $e$, of the rod or bar D is elastic, so as to form a spring, and this part $e$ passes through an eye, $f$, in the bail C, the end of $e$ having a notch made in it to form a shoulder, $g$, to catch against a head, $h$, at one end of a small rod, E, which may be fitted loosely or hung on a pivot in the eye $f$ above the part $e$, as shown clearly in Fig. 2. The spring of the part $e$ has a tendency to keep the shoulder $g$ in contact with the head $h$ of the rod E, and causes the tines to be retained in an upward position when the fork is being elevated with its load, as shown in tint in Fig. 2. The attendant, however, at any time may cause the load to be discharged by pulling downward the back end of the rod E by means of a rope which is attached to it, thereby throwing up the front end of the head $h$ free from the shoulder $g$ of the elastic part $e$ of the rod or bar D, and permitting the tines to fall, as indicated in red outline, so that the load will drop off by its own gravity, the head A turning on the ends $c$ of the bail. When the fork is lowered and again filled or loaded the operator draws back the elastic part $e$ of D, so that the shoulder $g$ of $e$ will catch against the head $h$ of the rod E.

By this arrangement a very simple and efficient horse hay-fork is obtained, one which may be manufactured at a reasonable cost, be durable, and very readily operated.

Having thus described my invention, what I claim as new, and desire to secure by Letters Patent, is—

The bent rod or bar D, provided with an elastic part, $e$, and attached to the head A of the fork, in combination with the bail C, and rod E, all arranged to operate substantially as and for the purpose set forth.

D. B. CLEMENT.

Witnesses:
M. M. LIVINGSTON,
THOS. S. J. DOUGLAS.